Patented Dec. 27, 1949

2,492,716

UNITED STATES PATENT OFFICE 2,492,716

PROCESS FOR PRODUCING SODIUM MONOSULFIDE

Owen F. Sprague, Lawrence, Kans., assignor to Mathieson Chemical Corporation, a corporation of Virginia No Drawing. Application February 5, 1946, Serial No. 645,702

4 Claims. (Cl. 23—139)

My invention relates to an improved process for making sodium sulfide, $Na_2S$.

Sodium sulfide is a chemical which finds wide application In industry it is used, for example, as a catalyst in the production of urea, as a process material in dye making, soap making, metallurgy, ore reduction, pulp manufacture, glass manufacture, and textile treatments, and as a depilatory in leather tanning and cosmetic preparations. In agriculture, it is employed, for example, as an ingredient of fungicidal preparations, in sheep dips, and in weed-destroying compositions.

My process for making sodium sulfide is chiefly advantageous over heretofore known processes in that it is more simple and less costly in execution. It involves as starting materials only soda ash, sulfur, and a hydrocarbon oil or wax, e. g. petroleum oil, tetralin (tetrahydronaphthalene), paraffin, etc. Best results are obtained using 1 part by weight of sulfur for each 3 parts of sodium carbonate. The weight of the hydrocarbon, for best results, should equal about one-tenth the combined weight of sodium carbonate and sulfur. The commercially available synthetic salt cake consists essentially of sodium carbonate and sulfur and as these components are present in about 1:3 ratio I find it convenient to employ this material in the practice of my process.

In carrying out my process I form a fused mixture of the starting materials in a suitable gas-fired or electric furnace, for example. The mixture is kept in the furnace, in the absence of air, at a temperature of the order of 1000°–1100° C. until the reaction is complete—usually from 2½ to 5 hours. The reaction product consists of sodium sulfide of a purity of 90% or better. The anhydrous material has about the same solubility characteristics as anhydrous caustic soda. A simple recrystallization will yield a white crystalline material, $Na_2S.9H_2O$, having much the appearance of purified rock salt.

Understanding that I will not be held for the accuracy of any theory advanced herein, I may state that it is my belief that the reaction in the furnace proceeds as indicated by the following equations:

(1) $Hydrocarbon + S \rightarrow H_2S + C$
(2) $H_2S + Na_2CO_3 \rightarrow Na_2S + H_2O + CO_2$
(3) $Na_2S + 3S \rightarrow Na_2S_4$
(4) $2C + Na_2CO_3 \rightarrow 2Na + 3CO$
(5) $6Na + Na_2S_4 \rightarrow 4Na_2S$ The foregoing is supported by the fact that careful analysis of the furnace product has never shown the presence of compounds other than $Na_2S$, $Na_2S_4$ and unreacted carbonate. However, I have observed that sodium sulfate will be formed if the molten material is not kept out of contact with air.

The vessel in which the mixture is heated in the furnace should be formed of a suitably resistant material. I have found that graphite will hold up very well and I recommend it. Glazed porcelain is not attacked too rapidly to preclude its use but I have found no metals or alloys capable of resisting the action of the molten $Na_2S$. The metals I have tested include Monel, copper, nickel and iron.

The following examples are submitted in further illustration of my invention:

Example I

A small electric furnace having a pot capacity of about one pound of fusion was constructed. Into the pot were introduced about 40 grams of sodium carbonate, about 14 grams sulfur and about 5 grams petroleum oil. The mixture was fused and held at temperatures between 1000° C.–1100° C. for a period of about four hours. The product was then recovered by removing it from the furnace. It analyzed 94.8% sodium monosulfide, the balance being unreacted sodium carbonate and sodium tetrasulfide.

Example II

The experiment of Example I was repeated with substantially the same result, the product analyzing 93.7% of sodium monosulfide.

Example III

When 5 grams of paraffin were substituted for the 5 grams petroleum oil the product showed 91% sodium monosulfide.

Example IV

The experiment of Example I was repeated but the reaction period was cut to 40 minutes. The product analyzed only 61.3% sodium monosulfide.

Example V

The experiment was repeated using 10 grams of the petroleum oil, the other proportions remaining the same. Examination of the contents of the pot after one hour's reaction revealed a very black mass indicating a large quantity of unused carbon.

Example VI 40 grams Na₂CO₃, 13 grams S, and 26 grams tetralin were mixed and then fused. The cooled product was yellowish colored. Its solution evolved H₂S upon acidification and BaCl₂ precipitated as BaCO₃. This showed Na₂S formation and the operability of tetralin in the process.

I claim:

1. A process for producing sodium monosulfides of at least about 90% purity which comprises heating at a temperature of from about 1000° C. to 1100° C. a fused mixture consisting essentially of sodium carbonate, sulfur and a normally non-gaseous hydrocarbon material, in which the amount of hydrocarbon material is about 10% by weight on the sodium carbonate and sulfur, and the weight ratio of sulfur to carbonate is about 1 to 3, and recovering the sodium monosulfide.

2. The process of producing sodium monosulfide as set forth in claim 1 in which the hydrocarbon is petroleum oil and the heating is continued for a period of from two and one-half to five hours.

3. The process of producing sodium monosulfide as set forth in claim 1 in which the hydrocarbon is paraffin and the heating is continued for a period of two and one-half to five hours.

4. The process of producing sodium monosulfide as set forth in claim 1 in which the hydrocarbon is tetralin and the heating is continued for a period of from two and one-half to five hours.

OWEN F. SPRAGUE.

REFERENCES CITED

The following references are of record in the file of this patent:

UNITED STATES PATENTS

| Number | Name | Date |
|---|---|---|
| 1,779,536 | Goodell | Oct. 28, 1930 |
| 2,106,952 | Konig | Feb. 1, 1938 |
| 2,223,631 | MacMullin | Dec. 3, 1940 |

OTHER REFERENCES

Mellor, "Inorganic and Theoretical Chemistry;" Longmans, Green & Co., New York, vol. II (1922), page 622.